United States Patent
Borbe et al.

(10) Patent No.: US 6,843,532 B2
(45) Date of Patent: Jan. 18, 2005

(54) LONGITUDINAL ADJUSTER FOR A VEHICLE SEAT

(75) Inventors: Michael Borbe, Rheinbach (DE); Heinz Voss, Leverkusen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/727,766

(22) Filed: Dec. 4, 2003

(65) Prior Publication Data

US 2004/0108762 A1 Jun. 10, 2004

Related U.S. Application Data

(63) Continuation of application No. PCT/EP03/01062, filed on Feb. 4, 2003.

(30) Foreign Application Priority Data

Feb. 11, 2002 (DE) .......................................... 102 06 300

(51) Int. Cl.$^7$ ............................ B60N 2/42; B60N 2/427; B60R 21/00
(52) U.S. Cl. ............................. 297/344.11; 297/216.1; 297/216.15; 297/216.16; 297/216.18; 248/429; 248/430
(58) Field of Search .......................... 297/344.11, 216.1, 297/216.15, 216.16, 216.18; 248/429, 430

(56) References Cited

U.S. PATENT DOCUMENTS

| | | | | |
|---|---|---|---|---|
| 4,068,887 A | * | 1/1978 | Babbs ..................... | 297/216.18 |
| 4,248,480 A | * | 2/1981 | Koucky et al. ..... | 297/216.18 X |
| 5,087,009 A | * | 2/1992 | Borlinghaus et al. ....... | 248/429 |
| 5,234,189 A | | 8/1993 | Myers ......................... | 248/429 |
| 5,931,436 A | | 8/1999 | Rohee ..................... | 248/429 X |
| 6,079,688 A | * | 6/2000 | Levillain et al. ............ | 248/429 |
| 6,113,051 A | | 9/2000 | Moradell et al. ........... | 248/430 |
| 6,488,250 B1 | * | 12/2002 | Munch ........................ | 248/430 |
| 6,669,284 B2 | * | 12/2003 | Feichtinger et al. ... | 297/216.18 |
| 2003/0150971 A1 | * | 8/2003 | Becker et al. .............. | 248/429 |

FOREIGN PATENT DOCUMENTS

| | | |
|---|---|---|
| DE | 84 22 275.1 | 1/1985 |
| EP | 0 349 918 A2 | 1/1990 |
| EP | 0 842 808 A1 | 5/1998 |
| FR | 2 759 330 A | 8/1998 |

* cited by examiner

*Primary Examiner*—Rodney B White
(74) *Attorney, Agent, or Firm*—Womble Carlyle Sandridge & Rice, PLLC

(57) ABSTRACT

In a longitudinal adjuster (3) for a vehicle seat, in particular a motor vehicle seat, having a first seat rail (5), a second seat rail (8) that can be slid lengthwise relative to the first seat rail (5), and at least one locking element (12) movably borne in the second seat rail (8), reaching outward at least in certain areas through openings (26, 28) of the second seat rail (8) and cooperating with notches (29) of the first seat rail (5) to lock the longitudinal adjuster (3), at least one marginal layer (22') of the locking element (12) is softer than a marginal area (28') of the second seat rail (8) bordering the openings (26, 28) and/or a marginal area of the first seat rail (5) bordering the notches (29).

22 Claims, 1 Drawing Sheet

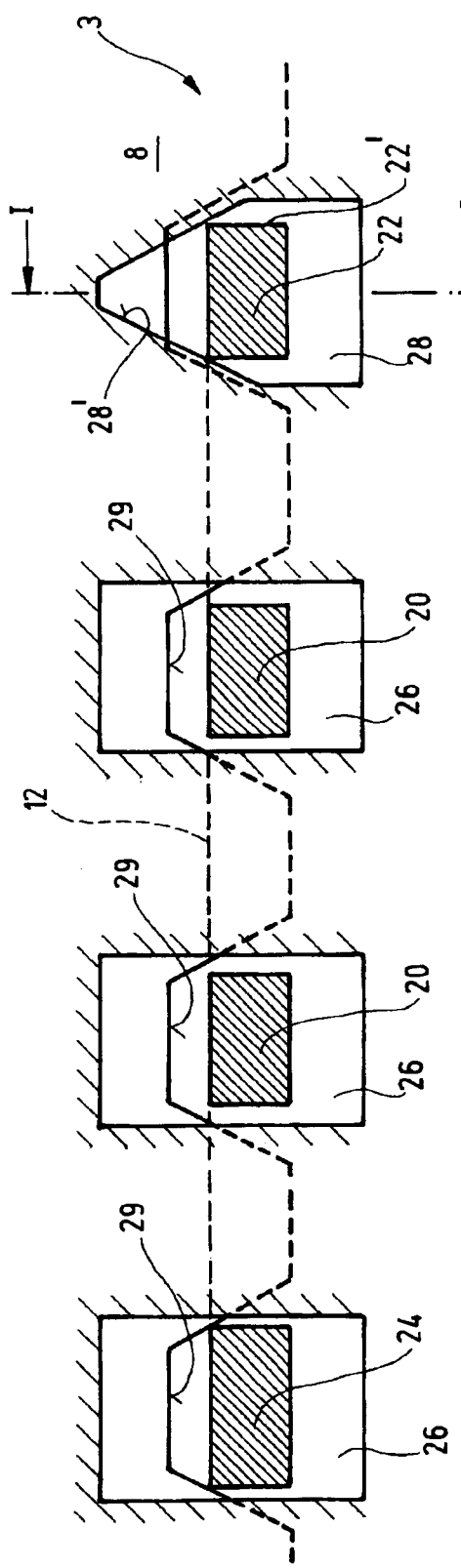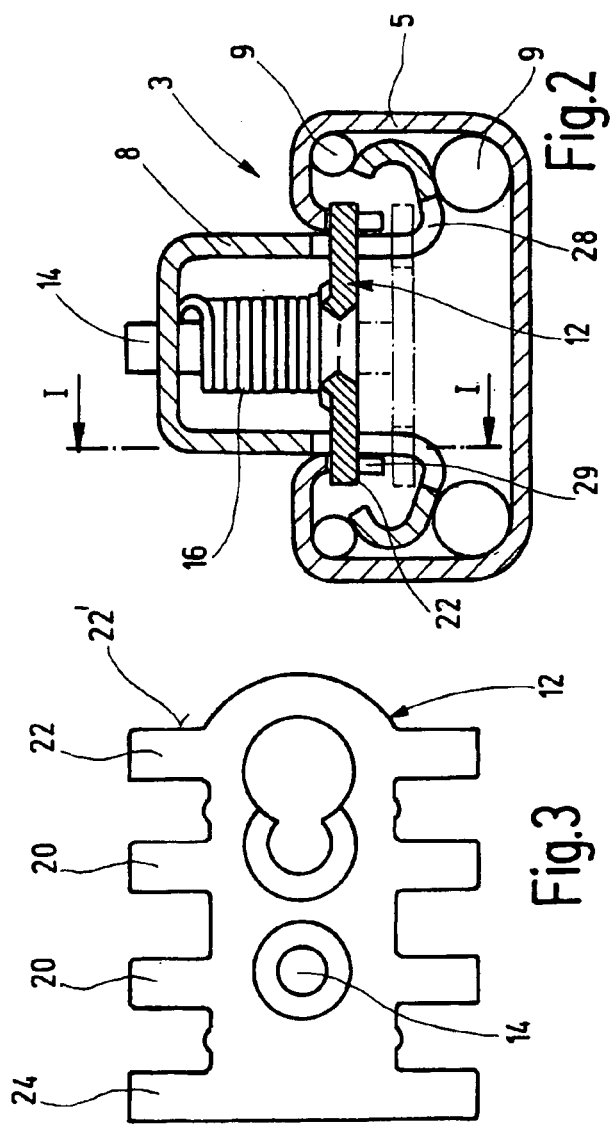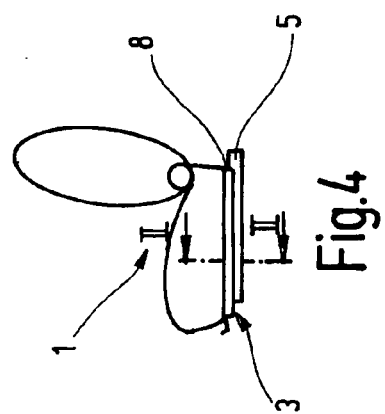

LONGITUDINAL ADJUSTER FOR A VEHICLE SEAT

CROSS-REFERENCE TO RELATED APPLICATION

The present application is a continuation of PCT/EP03/01062, which was filed Feb. 4, 2003, and is incorporated herein by reference in its entirety.

BACKGROUND OF THE INVENTION

The present invention relates to a longitudinal adjuster for a vehicle seat, in particular for a motor vehicle seat, having a first seat rail, a second seat rail that can be slid lengthwise relative to the first seat rail, and at least one locking element movably borne in the second seat rail, reaching outward at least in certain areas through openings of the second seat rail and cooperating with notches of the first seat rail to lock the longitudinal adjuster.

From EP 0 842 808 A1, a longitudinal adjuster of the above-described type for a vehicle seat is known, in which several locking clamps that are able to be activated together manually are pivotably borne on the second seat rail. Each locking clamp has four teeth on each longitudinal side. The notches in the first seat rail cooperating with the teeth have a funnel-shaped outer receptor area ensuring the reception of at least one locking clamp, and an inner receptor area with parallel flanks which actually does the locking.

BRIEF SUMMARY OF THE INVENTION

One aspect of the present invention is the provision of an improved longitudinal adjuster. In accordance with one aspect of the present invention, a longitudinal adjuster for a vehicle seat, in particular a motor vehicle seat, has a first seat rail, a second seat rail that can be slid lengthwise relative to the first seat rail, and at least one locking element movably borne in the second seat rail, reaching outward at least in predetermined areas through openings of the second seat rail and cooperating with notches of the first seat rail to lock the longitudinal adjuster. In accordance with this aspect, at least one marginal layer of the locking element is softer than a marginal area of the second seat rail bordering the openings and/or a marginal area of the first seat rail bordering the notches.

Since at least a marginal layer of the locking element is softer than the marginal area bordering the openings and/or a marginal area of the first seat rail bordering the notches, plastic deformation of the marginal areas of the seat rails under stress due to the hardness of the locking element is avoided. This is particularly advantageous if the function of the surfaces of the marginal areas is to guide the locking element; i.e. if the surfaces are funnel-shaped and/or boarder a trapezoid opening, so that the locking element does not have any play when in its final locking position. Plastic deformation of these marginal areas would disallow reaching a play-free state.

Preferably, the locking element is manufactured in such a way that only the marginal area is soft and the core is hard in order to better handle the stress. This is preferably achieved by subjecting the marginal area of the locking element to decaburization, e.g. during the heat treatment, after the hardening. Thus, costs are kept low. With this solution, the marginal area thus originally consists of the same material as the core and is formed in one piece with the core, wherein after hardening the entire locking element the marginal layer then again becomes softer than the core through the decarburization. Another option is a coating or a sandwich structure in which different materials are used from the beginning. All these solutions produce locking elements with locally differing hardness.

The longitudinal adjuster according to the present invention can be used for all types of longitudinally adjustable seats. In the case of a preferred embodiment of the locking element in the form of a rigid notch plate with laterally protruding teeth, the width of at least one outer tooth differs from that of the other teeth in the longitudinal direction of the rail in order to improve the play-free latching into the lower rail. One tooth or two opposing teeth may be of greater widths.

BRIEF DESCRIPTION OF THE DRAWINGS

The present invention is explained in greater detail below with reference to an exemplary embodiment illustrated in the drawings, in which:

FIG. 1 is a schematized, only partially shown longitudinal section through the exemplary embodiment in the area of a notch plate along the line I—I in FIG. 2 in a locked position, FIG. 2 is a cross section through the exemplary embodiment along the line I—I in FIG. 1 and along the line II—II in FIG. 4 in a locked position, the unlocked position being shown by a dashed line, FIG. 3 is a top view of the notch plate, and FIG. 4 is a schematic side view of a vehicle seat.

DETAILED DESCRIPTION OF THE INVENTION

A device for longitudinally adjusting a vehicle seat 1 is hereinafter referred to as a longitudinal adjuster 3. The normal orientation of the vehicle seat 1 in a motor vehicle and the vehicle's normal driving direction will define the following directional references. The longitudinal adjuster 3 has, on both sides of the vehicle seat 1, a vehicle structure-fixed lower rail 5 as a first seat rail, and a seat structure-fixed upper rail 8 as a second seat rail. The lower rail 5, having an approximately U-shaped profile and being open at the top, and the upper rail 8, also having an approximately U-shaped profile and being open at the bottom, interlock with one another with their inward-bent and outward-bent edges, respectively. The upper rail 8 functions as the runner rail and slides lengthwise on bearing balls 9 that are between the rails 8 and 5. The upper rail 8 is guided in the lower rail 5, which functions as the guide rail.

There is at least one notch plate 12 having the function of a locking element for locking the upper rail 8 and the lower rail 5. There may also be several notch plates 12 arranged lengthwise behind each other. The notch plate 12 is arranged more or less horizontally inside a mounting space defined by the upper rail 8. The movement of the notch plate 12 in a vertical direction relative to the upper rail 8 is guided by way of a guide bolt 14 protruding vertically. A certain play is provided between the guide bolt 14 and the upper rail 8. A pre-loaded reset spring 16 that is arranged beside the guide bolt 14 is attached between the notch plate 12 and the upper rail 8 for ensuring an upward-directed pre-loading of the notch plate 12. There may also be two reset springs 16.

On both of its longitudinal sides, the notch plate 12 has four horizontal teeth protruding transversally from the longitudinal direction of the rail. The inner (with respect to the longitudinal direction of the rails) teeth have the reference number 20 and the outer (with respect to the longitudinal direction of the rails) teeth have the numbers 22 and 24. The teeth 20, 22 and 24 arranged opposite each other are referred to as pairs. The inner teeth 20 and a first pair of outer teeth 22 have the same width in the longitudinal direction of the rails, whereas the second pair of outer teeth 24 is of greater width. The inner teeth 20 and the second pair of outer teeth 24 reach through approximately rectangular first openings 26 in the upper rail 8. The first pair of outer teeth 22 reaches through a second opening 28 having, in its upper section, a trapezoid shape and, in the adjacent section, a rectangular shape.

In a locked position of the longitudinal adjuster 3, the teeth 20, 22 and 24 reach into downward-opening notches 29 in the lower rail 5. The notches 29, which are more or less distributed over the entire length of the lower rail 5, are equidistant and of identical shape. The transition into the unlocked position is through a lifting mechanism (not shown in detail) that presses the guide bolt 14 downward. During transition from the unlocked position to the locked position, occurring through the force of the reset spring 16, the marginal area 28' of the upper rail 8, bordering the second opening 28 in the trapezoid area, serves as a guiding surface for the movement of the notch plate 12. The shape of this marginal area 28' and the greater width of the second pair of outer teeth 24 ensures play-free locking of the notch plate 12, the first pair of outer teeth 22 ensuring play-free state with respect to the upper rail 8 and the second pair of outer teeth 24 ensuring play-free state with respect to the lower rail 5.

To keep the outer teeth 22 from accidentally digging into the marginal area 28', which would prevent further play-free functioning, the marginal layer 22' of at least the outer teeth 22 is softer than the marginal area 28'. In a preferred embodiment according to the invention, this is achieved by producing the notch plate 12 from marginally decarburized heat-treatable steel. The process of marginal decarburization is performed after hardening in such a way as to produce a hard core able to handle the necessary static and dynamic stress, and a soft, defined, sufficiently deep marginal area 22' being in one piece with the core which, because of the contact conditions between the notch plate 12 and the marginal area 28', may be plastically deformed under stress without any plastic deformation of the marginal area 28'. This way, locking, even after plastic deformation, is play-free. By integrating the marginal decarburization into the heat treatment, no additional costs will arise or, in comparison with sandwich construction, only moderate additional costs.

That which is claimed:

1. A longitudinal adjuster for a vehicle seat, the longitudinal adjuster comprising:
a first seat rail, a second seat rail that can be slid lengthwise relative to the first seat rail, and at least one locking element movably borne in the second seat rail, with the locking element reaching outward at least in predetermined areas through openings of the second seat rail and cooperating with notches of the first seat rail to lock the longitudinal adjuster,
wherein at least one marginal layer of the locking element is softer than at least one marginal area selected from the group consisting of:
a marginal area of the second seat rail, wherein the marginal area of the second seat rail boarders the openings, and
a marginal area of the first seat rail, wherein the marginal area of the first seat rail boarders the notches; and
wherein the marginal layer of the locking element is softer than a core of the locking element.

2. A longitudinal adjuster according to claim 1, wherein the marginal layer of the locking element contains less carbon per unit area than the core of the locking element.

3. A longitudinal adjuster according to claim 2, wherein the locking element comprises a plate having pairs of teeth respectively reaching through the openings of the second seat rail for interacting with the notches of the first seat rail.

4. A longitudinal adjuster according to claim 3, wherein at least some of the teeth are arranged in a longitudinal series having outer teeth which are respectively at ends of the series and inner teeth which are positioned between the outer teeth, and at least one of the outer teeth differs in width from the inner teeth.

5. A longitudinal adjuster according to claim 2, wherein for at least one opening of the openings in the second seat rail, the marginal area of the second seat rail comprises a guide surface which boarders the at least one opening and extends obliquely with respect to the lengthwise sliding of the second seat rail relative to the first rail, so that the guide surface is operative for guiding the locking element into the at least one opening.

6. A longitudinal adjuster according to claim 1, wherein the locking element comprises a plate having pairs of teeth respectively reaching through the openings of the second seat rail for interacting with the notches of the first seat rail.

7. A longitudinal adjuster according to claim 6, wherein at least some of the teeth are arranged in a longitudinal series having outer teeth which are respectively at ends of the series and inner teeth which are positioned between the outer teeth, and at least one tooth of the outer teeth differs in width from the inner teeth.

8. A longitudinal adjuster according to claim 7, wherein for at least one opening of the openings in the second seat rail, the marginal area of the second seat rail comprises a guide surface which boarders the at least one opening and extends obliquely with respect to the lengthwise sliding of the second seat rail relative to the first rail, so that the guide surface is operative for guiding the at least one tooth into the at least one opening.

9. A longitudinal adjuster according to claim 1, wherein for at least one opening of the openings in the second seat rail, the marginal area of the second seat rail comprises a guide surface which boarders the at least one opening for guiding the locking element into the at least one opening.

10. A longitudinal adjuster for a vehicle seat, the longitudinal adjuster comprising:
a first seat rail, a second seat rail that can be slid lengthwise relative to the first seat rail, and at least one locking element movably borne in the second seat rail, with the locking element reaching outward at least in predetermined areas through openings of the second seat rail and cooperating with notches of the first seat rail to lock the longitudinal adjuster, wherein:
at least one marginal layer of the locking element is softer than at least one marginal area selected from the group consisting of:
a marginal area of the second seat rail, wherein the marginal area of the second seat rail boarders the openings, and
a marginal area of the first seat rail, wherein the marginal area of the first seat rail boarders the notches;
for at least one opening of the openings in the second seat rail, the marginal area of the second seat rail comprises a guide surface which boarders the at least one opening for guiding the locking element into the at least one opening; and the opening bordered by the guide surface has at least one trapezoidal cross section.

11. A longitudinal adjuster according to claim 10, wherein the locking element comprises a plate having pairs of teeth respectively reaching through the openings of the second seat rail for interacting with the notches of the first seat rail.

12. A longitudinal adjuster according to claim 11, wherein at least some of the teeth are arranged in a longitudinal series having outer teeth which are respectively at ends of the series and inner teeth which are positioned between the outer teeth, and at least one of the outer teeth differs in width from the inner teeth.

13. A longitudinal adjuster according to claim 10, wherein the marginal layer of the locking element is softer than a core of the locking element.

14. A longitudinal adjuster according to claim 10, wherein the longitudinal adjuster is in combination with the vehicle seat.

15. A longitudinal adjuster according to claim 1, wherein the longitudinal adjuster is in combination with the vehicle seat.

16. A longitudinal adjuster according to claim 1, wherein for at least one opening of the openings in the second seat rail, the marginal area of the second seat rail comprises a guide surface which boarders the at least one opening and extends obliquely with respect to the lengthwise sliding of the second seat rail relative to the first rail, so that the guide surface is operative for guiding the locking element into the at least one opening.

17. A longitudinal adjuster for a vehicle seat, the longitudinal adjuster comprising:
a first seat rail, a second seat rail that can be slid lengthwise relative to the first seat rail, and at least one locking element movably borne in the second seat rail, with the locking element reaching outward at least in predetermined areas through openings of the second seat rail and cooperating with notches of the first seat rail to lock the longitudinal adjuster, wherein:
at least one marginal layer of the locking element is softer than at least one marginal area selected from the group consisting of:
a marginal area of the second seat rail, wherein the marginal area of the second seat rail boarders the openings, and
a marginal area of the first seat rail, wherein the marginal area of the first seat rail boarders the notches;
the locking element comprises a plate having pairs of teeth respectively reaching through the openings of the second seat rail for interacting with the notches of the first seat rail;
at least some of the teeth are arranged in a longitudinal series having outer teeth which are respectively at ends of the series and inner teeth which are positioned between the outer teeth, and at least one tooth of the outer teeth differs in width from the inner teeth;
the longitudinal series is a first series;
at least some of the teeth are arranged in a longitudinal second series having:
outer teeth which are respectively at ends of the second series, and
inner teeth which are positioned between the outer teeth of the second series;
at least one tooth of the outer teeth of the second series differs in width from the inner teeth of the second series; and
the at least one tooth of the first series is opposite from the at least one tooth of the second series.

18. A longitudinal adjuster according to claim 17, wherein the marginal layer of the locking element is softer than a core of the locking element.

19. A longitudinal adjuster according to claim 17, wherein the longitudinal adjuster is in combination with the vehicle seat.

20. A longitudinal adjuster for a vehicle seat, the longitudinal adjuster comprising:
a first seat rail, a second seat rail that can be slid lengthwise relative to the first seat rail, and at least one locking element movably borne in the second seat rail, with the locking element reaching outward at least in predetermined areas through openings of the second seat rail and cooperating with notches of the first seat rail to lock the longitudinal adjuster, wherein:
at least one marginal layer of the locking element is softer than at least one marginal area selected from the group consisting of:
a marginal area of the second seat rail, wherein the marginal area of the second seat rail boarders the openings, and
a marginal area of the first seat rail, wherein the marginal area of the first seat rail boarders the notches;
the locking element comprises a plate having pairs of teeth respectively reaching through the openings of the second seat rail for interacting with the notches of the first seat rail;
at least some of the teeth are arranged in a longitudinal series having outer teeth which are respectively at ends of the series and inner teeth which are positioned between the outer teeth,
at least one tooth of the outer teeth differs in width from the inner teeth;
for at least one opening of the openings in the second seat rail, the marginal area of the second seat rail comprises a guide surface which boarders the at least one opening and extends obliquely with respect to the lengthwise sliding of the second seat rail relative to the first rail, so that the guide surface is operative for guiding the at least one tooth into the at least one opening; and
the at least one opening has at least one trapezoid cross section.

21. A longitudinal adjuster according to claim 20, wherein the marginal layer of the locking element is softer than a core of the locking element.

22. A longitudinal adjuster according to claim 20, wherein the longitudinal adjuster is in combination with the vehicle seat.

* * * * *